United States Patent
Carson

(10) Patent No.: US 10,039,406 B2
(45) Date of Patent: Aug. 7, 2018

(54) STEAM COOKER

(71) Applicant: George Carson, Chicago, IL (US)

(72) Inventor: George Carson, Chicago, IL (US)

( * ) Notice: Subject to any disclaimer, the term of this patent is extended or adjusted under 35 U.S.C. 154(b) by 0 days.

(21) Appl. No.: 14/607,337

(22) Filed: Jan. 28, 2015

(65) Prior Publication Data

US 2015/0208847 A1    Jul. 30, 2015

Related U.S. Application Data

(60) Provisional application No. 61/933,115, filed on Jan. 29, 2014.

(51) Int. Cl.
*A47J 27/06* (2006.01)
*A47J 36/16* (2006.01)
*A47J 27/04* (2006.01)

(52) U.S. Cl.
CPC .............. *A47J 27/06* (2013.01); *A47J 36/16* (2013.01); *A47J 2027/043* (2013.01)

(58) Field of Classification Search
CPC ...... A47J 27/06; A47J 36/16; A47J 2027/043; A47J 41/0077; A47J 27/04; A47J 36/18; A47J 37/0704; F24D 1/00
USPC .................... 99/443 R, 447, 413; 126/369
See application file for complete search history.

(56) References Cited

U.S. PATENT DOCUMENTS

| | | | | |
|---|---|---|---|---|
| 211,202 A | * | 1/1879 | Whitney et al. | A47J 27/04 126/369 |
| 214,908 A | * | 4/1879 | Hand | A47J 27/04 126/19 R |
| 466,137 A | * | 12/1891 | Hobson | A47J 27/04 126/369 |
| 2,516,202 A | * | 7/1950 | Graham | A47J 27/0804 126/369 |
| 5,400,701 A | * | 3/1995 | Sham | A47J 27/04 126/369 |

* cited by examiner

*Primary Examiner* — Dana Ross
*Assistant Examiner* — Bao D Nguyen
(74) *Attorney, Agent, or Firm* — Bill C Panagos; Daniel J. Cheekowsky; Panagos Law Group PLLC

(57) ABSTRACT

A steam cooker with a first pot and a second pot is provided. The second pot may fit within the first pot and may be suspended above the bottom of the first pot. The bottom of the first pot may be filled with water. Food may be placed within the second pot. A lid may cover the first pot, sealing the water and the second pot within. The first pot may be heated by a fire or stove. The steam from the heated water may sufficiently cook the food. Further, condensation may be collected and water may drip into the second pot. The water is purified due to the boiling process.

5 Claims, 3 Drawing Sheets

STEAM COOKER

CROSS-REFERENCE TO RELATED APPLICATION

This application claims the benefit of priority of U.S. provisional application No. 61/933,115 filed Jan. 29, 2014, the contents of which are herein incorporated by reference.

BACKGROUND OF THE INVENTION

The present invention relates to a cooking device and, more particularly, to a steam cooker.

Steaming is a method of cooking using steam. Steaming is considered a healthy cooking technique and capable of cooking almost all kinds of food. Steaming works by boiling water continuously, causing it to vaporize into steam; the steam then carries heat to the nearby food, thus cooking the food. The food is kept separate from the boiling water but has direct contact with the steam, resulting in a moist texture to the food. Overcooking or burning food is easily avoided when steaming it. Individuals looking to not increase their fat intake may prefer steaming to other methods which require cooking oil. Steaming also results in a more nutritious food than boiling because fewer nutrients are leached away into the water.

As can be seen, there is a need for easy to use steam cookers to prevent foods from burning and to retain the nutrients within the food.

SUMMARY OF THE INVENTION

In one aspect of the present invention, a steam cooker comprises: a first pot comprising a base and a sidewall with an interior surface and an exterior surface, wherein the sidewall comprises an upper rim forming an opening leading into the interior surface, wherein at least one ledge is protruding from the interior surface of the sidewall; a second pot sized to fit within the first pot and comprising a base and a sidewall with an interior surface and an exterior surface, wherein the sidewall comprises an upper rim forming an opening leading into the interior surface, wherein at least one tab is protruding from the exterior surface of the sidewall, wherein the at least one tab rests on the at least one ledge, suspending the second pot within the first pot and forming a gap in between the interior surface of the first pot and the interior surface of the second pot; and a lid sized to rest on the upper rim of the first pot and thereby cover the opening of the first pot with the second pot within the first pot, wherein a gap is formed in between the lid and the upper rim of the second pot.

In another aspect of the present invention, a steam cooker comprises: a first pot comprising a base and a sidewall with an interior surface and an exterior surface, wherein the sidewall comprises an upper rim forming an opening leading into the interior surface, wherein at least one ledge is protruding from the interior surface of the sidewall; a second pot sized to fit within the first pot and comprising a base and a sidewall with an interior surface and an exterior surface, wherein the sidewall comprises an upper rim forming an opening leading into the interior surface, wherein at least one tab is protruding from the exterior surface of the sidewall, wherein the at least one tab rests on the at least one ledge, suspending the second pot within the first pot and forming a gap in between the interior surface of the first pot and the interior surface of the second pot; and a lid sized to rest on the upper rim of the first pot and thereby cover the opening of the first pot with the second pot within the first pot, wherein a gap is formed in between the lid and the upper rim of the second pot, wherein the lid comprises a convex shape from an edge of the lid to a center of the lid along the lids entire circumference.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes a double pot hydro steam cooker. Using the present invention, food will not burn if unattended, the user does not have to worry about cooking within contaminated water and there is a minimum loss of nutrition. The food does not come in to direct contact with the heat source, the food is only cooked by steam and the self distilled water is produced during the process. The present invention may be made out of metal, plastics, tempered glass, and ceramics.

Figure 1:
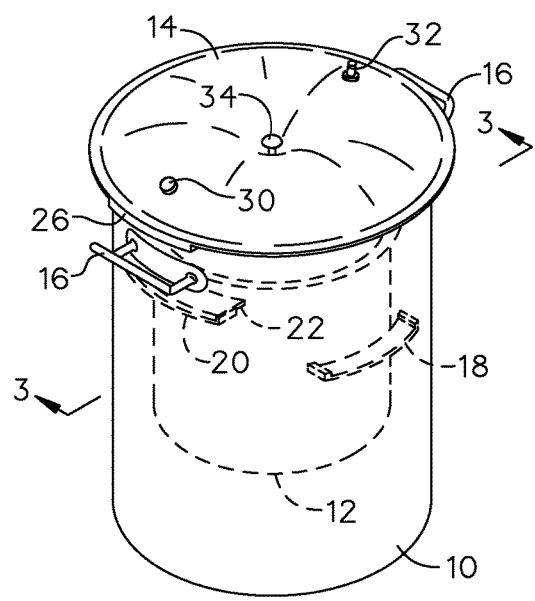
FIG. 1 is a perspective view of an embodiment of the present invention.
Figure 2:
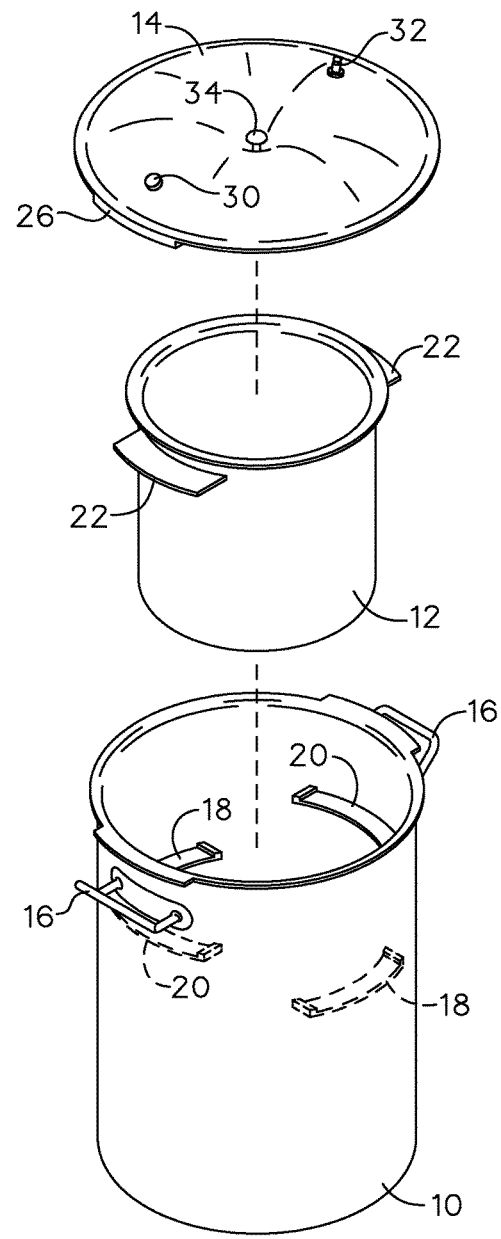
FIG. 2 is an exploded view of the embodiment of FIG. 1.
Figure 3:
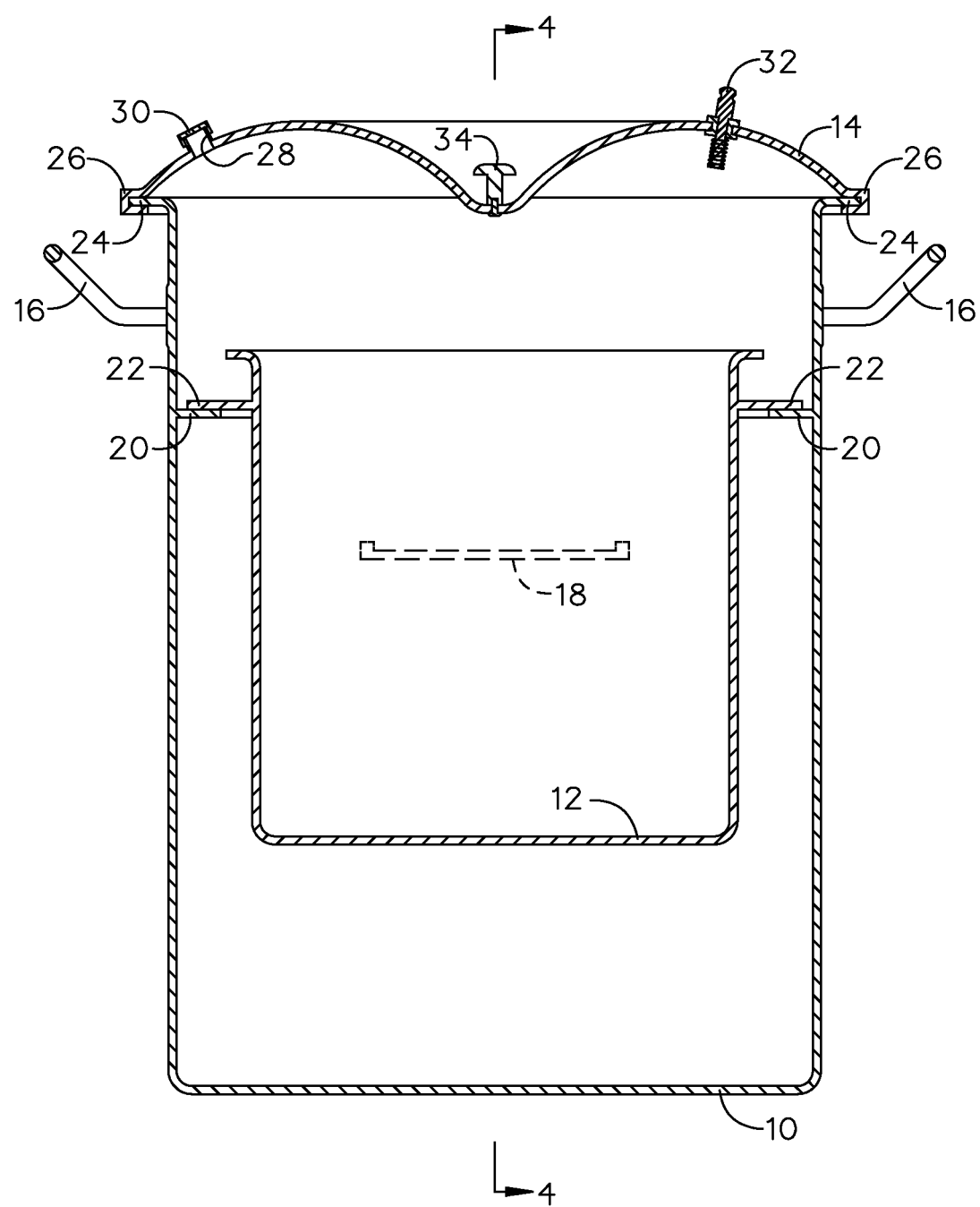
FIG. 3 is a section view of the present invention, taken along line 3-3 in FIG. 1.
Figure 4:
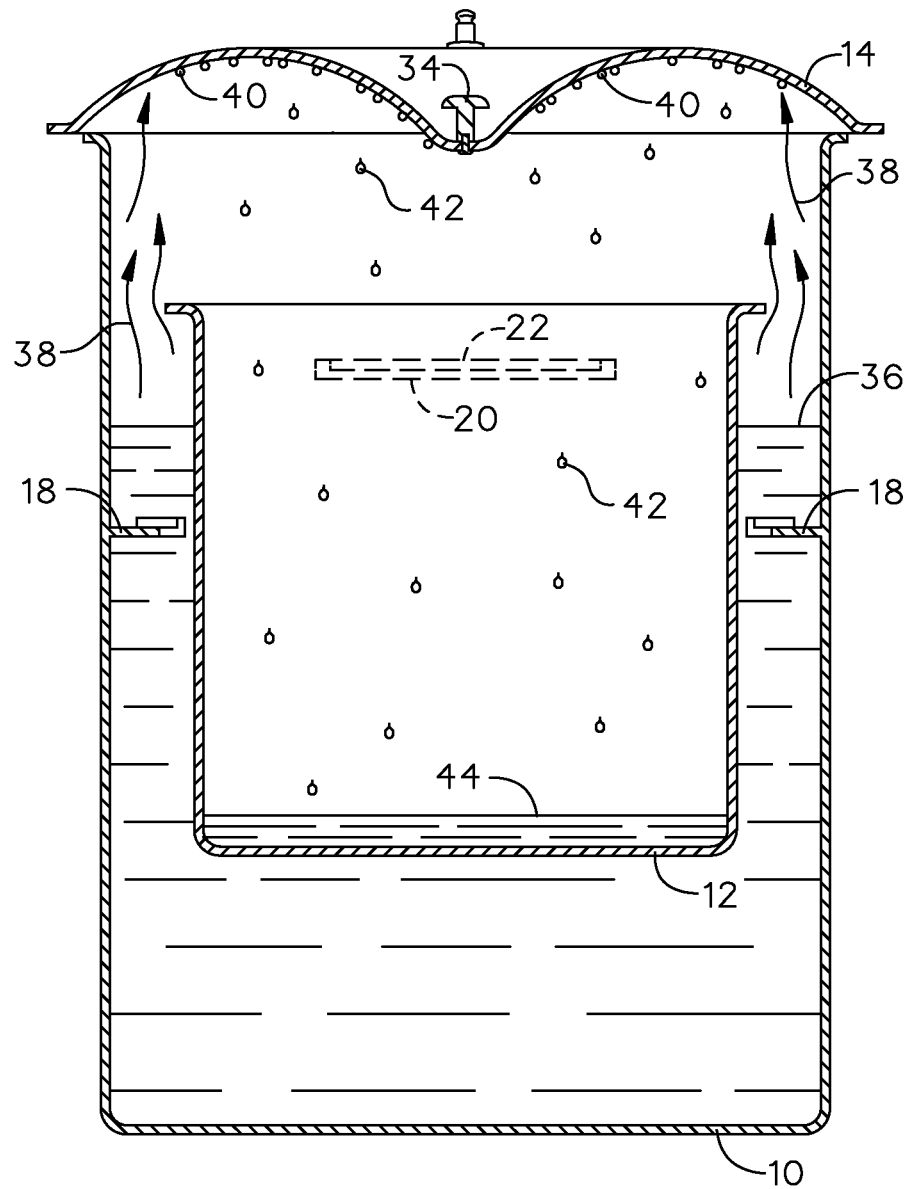
FIG. 4 is a section view of the present invention, taken along line 4-4 in FIG. 3, illustrating the purification of water when boiled.

Referring to FIGS. 1 through 4, the present invention includes a steam cooker with a first pot 10 and a second pot 12. The second pot 12 may fit within the first pot 10 and may be suspended above the base of the first pot 10. The bottom of the first pot 10 may be filled with water 36. Food may be placed within the second pot 12. A lid 14 may cover the first pot 10, sealing the water 36 and the second pot 12 within. The first pot 10 may be heated by a fire or stove. The steam 38 from the heated water 36 may sufficiently cook the food. Further, condensation may be collected and water droplets 42 may drip into the second pot 12. The water 44 in the second pot 12 is purified due to the boiling process.

The first pot 10 of the present invention includes a base and a sidewall with an interior surface and an exterior surface. The sidewall includes an upper rim forming an opening leading into the interior surface. At least one ledge 18, 20 is protruding from the interior surface of the sidewall. In certain embodiments, the ledge 18, 20 may be a pair of ledges 18, 20 attached to opposing sides of the interior surface and aligned with one another. In certain embodiments, the at least one ledge 18, 20 may include an upper ledge 18, and a lower ledge 20. The upper ledge 18 is closer to the rim and a lower ledge 18 closer to the base. Each of the upper ledge 19 and the lower ledge 20 may include a pair of ledges attached to opposing sides of the interior surface. The first pot 10 may further include a pair of handles 16 protruding from the exterior surface of the sidewall.

As mentioned above, the second pot 12 is sized to fit within the first pot 10. The second pot 12 also includes a base and a sidewall with an interior surface and an exterior surface. The sidewall includes an upper rim forming an opening leading into the interior surface. The second pot 12 may include least one tab 22 protruding from the exterior surface of the sidewall. The at least one tab 22 may be a pair of tabs protruding on opposing sides of the exterior surface. The tabs 22 may align and rest on the ledge 18, 20 of the first pot 10. When the tabs 22 rest on the ledge 18, 20, the second pot 12 is suspended within the first pot 10 and a gap is formed in between the interior surface of the first pot 10 and the exterior surface of the second pot 12. The tabs 22 may rest on the upper ledges 20 or the lower ledges 18 allowing the second pot 12 to be suspended at different levels within the first pot 10.

The lid 14 is sized to rest on the upper rim of the first pot 10 and thereby cover the opening of the first pot 10 with the second pot 12 within the first pot 10, forming a gap between the lid 14 and the upper rim of the second pot 12. In certain embodiments, the lid 14 includes locking grips 26 that releasably attach to locking tabs 24 protruding from the rim of the first pot 10, thereby sealing the lid 14 onto the first pot 10. The locking grips 26 may form channels in which the locking tabs 24 fit within. The interior of the lid 14 may further include a concave shape from an edge of the lid 14 to a center of the lid 14 along the lid's entire circumference. Therefore, the vapor 38 from the water 36 may rise from in between the first pot 10 and second pot 12 and hit the lid 14 and the condensation 40 may be directed towards the center of the lid 14 so that the drops 42 may fall within the second pot 12. The lid 14 may further include a pressure valve 32 in case of increased pressure as well as an intake port 28 through the lid 14. The intake port 28 may be covered by an intake cap 30 when not in use. The lid 14 may further include a handle 34 protruding from a center of the lid 14 to easily grasp and remove the lid 14 from the first pot 10.

It should be understood, of course, that the foregoing relates to exemplary embodiments of the invention and that modifications may be made without departing from the spirit and scope of the invention as set forth in the following claims.

What is claimed is:

1. A steam cooker comprising:
    a first pot comprising a base and a sidewall with an interior surface and an exterior surface, wherein the sidewall comprises an upper rim forming an opening leading into the interior surface, an upper ledge and a lower ledge directly attached to and protruding from the interior surface of the sidewall, said upper ledge positioned on said interior surface of said sidewall intermediate said rim and said lower edge; said lower edge positioned intermediate said base and said upper edge;
    a second pot sized to fit within the first pot and comprising a base and a sidewall with an interior surface and an exterior surface, wherein the sidewall comprises an upper rim forming an opening leading into the interior surface, wherein at least one tab is protruding laterally directly from an exterior surface of the sidewall below the upper rim of the second pot, wherein the at least one tab rests on at least one ledge, suspending the second pot within and entirely below the upper rim of the first pot and above the base of the first pot and forming a gap in between the interior surface and base of the first pot and the exterior surface of the second pot; and
    a lid sized to rest on the upper rim of the first pot and thereby cover the opening of the first pot with the second pot within the first pot, wherein an interior side of the lid comprises a concave shape curving from an edge of the lid to a center of the lid along the entire circumference of the lid forming a peak at the center protruding inwardly towards the base of the second pot, wherein vapor drops rise in between the first pot and the second pot from water disposed within the first pot and hits the lid, wherein the vapor drops are directed towards the center of the lid so that the vapor drops fall within the second pot, the lid further comprising locking grips configured as channels to releasably receive locking tabs protruding laterally from the rim of the first pot to seal the lid onto the first pot.

2. The steam cooker of claim 1, wherein the lid comprises a pressure valve.

3. The steam cooker of claim 1, wherein the lid comprises an intake port therethrough and an intake cap formed to cover the intake port.

4. The steam cooker of claim 1, wherein the first pot further comprises a pair of handles extending from the exterior surface.

5. The steam cooker of claim 1, wherein the lid comprises a handle protruding from a center of the lid.

* * * * *